United States Patent [19]
Bilas

[11] 3,870,336
[45] Mar. 11, 1975

[54] VEHICLE SUSPENSION

[76] Inventor: Michael Bilas, 2730 Columbiana-New Castle Rd., New Springfield, Ohio 44443

[22] Filed: June 1, 1973

[21] Appl. No.: 366,136

Related U.S. Application Data
[63] Continuation-in-part of Ser. No. 208,073, Dec. 15, 1971, Pat. No. 3,740,071.

[52] U.S. Cl............................ 280/124 F, 180/24.02
[51] Int. Cl............................................. B60g 11/46
[58] Field of Search...... 280/124 F, 124 R, 104.5 R; 180/24.02, 22 D, 22 E

[56] References Cited
UNITED STATES PATENTS

| | | | |
|---|---|---|---|
| 2,896,963 | 7/1959 | Raman | 280/104.5 R |
| 3,315,978 | 4/1967 | Chieger | 280/104.5 R |
| 3,533,641 | 10/1970 | Driskill | 280/104.5 R |

Primary Examiner—Philip Goodman
Attorney, Agent, or Firm—Webster B. Harpman

[57] ABSTRACT

A vehicle suspension suitable for trucks and trailers positions a wheel and axle assembly on the vehicle on the trailing ends of a pair of single leaf springs arranged to urge the wheel and axle assembly toward the vehicle so as to lift the same from a road surface. Air bags are positioned between the wheel and axle assembly and the vehicle and means for inflating and deflating the air bags permit the wheel and axle assembly to be lifted from the road surface or engaged therewith in a weight carrying relation to the vehicle. The single leaf springs are attached at their forward ends to the conventional spring and axle assembly of the vehicle.

5 Claims, 3 Drawing Figures

PATENTED MAR 11 1975　　　　　　　　　　　　　　3,870,336

VEHICLE SUSPENSION

This invention is a continuation-in-part of my copending application Ser. No. 208,073 on VEHICLE SUSPENSION, filed Dec. 15, 1971 now U.S. Pat. No. 3,740,071.

BACKGROUND OF THE INVENTION

1. Field of the Invention

This invention relates to wheeled vehicles and more particularly to suspensions for wheeled vehicles such as trucks and trailers.

2. Description of the Prior Art

Suspensions of this type have employed springs normally urging the wheel and axle assemblies toward the road surface and modifications have employed springs normally urging the wheel and axle assembly away from the road surface and employed air bags for urging the wheel and axle assembly toward the road surface in supporting relation to the vehicle.

(See U.S. Pat. Nos. 2,989,300, 3,063,732, 3,093,388, 3,096,955, 3,113,745, 3,285,621 and 3,617,072.

This invention eliminates some of the problems heretofore associated with the prior art vehicle suspensions and provides an arrangement wherein a wheel and axle assembly is positioned on the ends of a pair of single leaf springs which are arranged in trailing arm fashion with respect to the conventional semi-elliptic spring suspension and axle assembly on the vehicle to which they are attached. This invention makes possible the use of a pair of single leaf springs arranged to adjustably position a wheel and axle assembly relative to the vehicle.

SUMMARY OF THE INVENTION

A vehicle suspension is disclosed which enables a pair of single leaf springs or similar leaf springs to function as trailing arm assemblies attached to the conventional spring and axle assemblies of the vehicle and support an auxiliary wheel and axle assembly and arranged to normally urge the auxiliary wheel and axle assembly away from the road surface so as to lift the same from engagement therewith. A pair of bags positioned above the auxiliary wheel and axle assembly will upon inflation cause the wheel and axle assembly to engage the road surface in supporting relation to the vehicle.

DESCRIPTION OF THE PREFERRED EMBODIMENT

Figure 1:
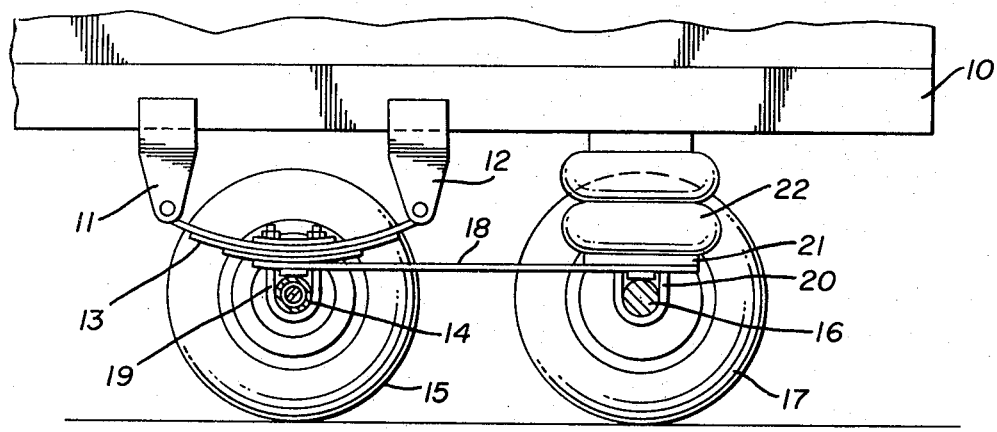
FIG. 1 is a side elevation of a vehicle with parts in cross section and parts broken away.
Figure 2:
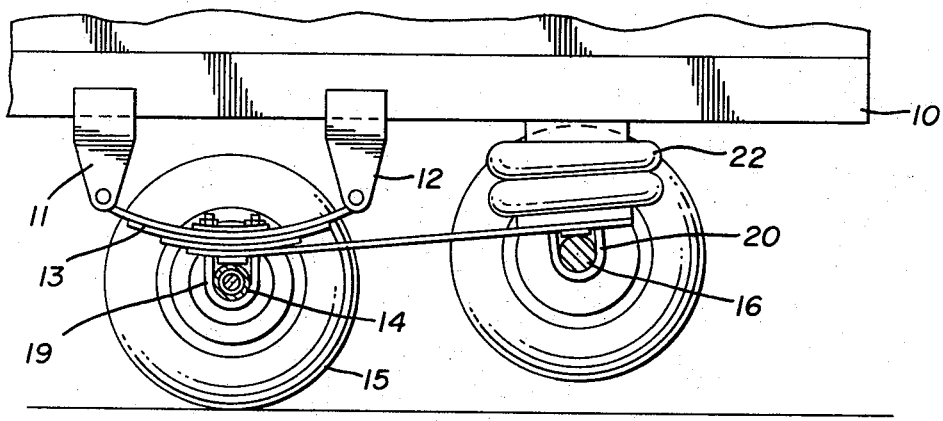
FIG. 2 is a side elevation of the vehicle with parts in cross section and parts broken away and illustrating a wheel and axle assembly in elevated relation.

In the form of the invention chosen for illustration and as seen in FIGS. 1 and 2 of the drawings, a vehicle 10 is provided with conventional spring suspension units 11 and 12 which support a pair of springs 13 and a conventional axle 14 is secured thereto. Wheels 15 are mounted on the axle 14 in the usual manner. The vehicle 10 is provided with an auxiliary wheel and axle assembly in which the axle is indicated by the numeral 16 and the wheels by the numeral 17 and which auxiliary wheel and axle assembly is positioned rearwardly of the axle 14 on the vehicle 10.

The axle 16 is supported on the trailing ends of a pair of single leaf springs 18 which are secured at their forward ends to the U-bolt clamps 19 which secure the single leaf springs 18 to the conventional springs 13 and axle 14. The rear ends of the single leaf springs 18 are secured to the axle 16 by secondary U-bolt clamps 20 and incorporate mounting discs 21 on which inflatable air bags 22 are positioned so as to occupy the space between the discs 21 and the vehicle 10. In FIG. 1 of the drawings the air bags 22 are shown in inflated relation between the trailing ends of the springs 18 and the vehicle 10 so as to urge the axle 16 and its wheels 17 downwardly against a road surface and in supporting relation to the vehicle 10.

By referring now to FIG. 2 of the drawings it will be seen that the air bags 22 have been deflated and that the pair of springs 18 have lifted the axle 16 and the pair of wheels 17 thereon upwardly toward the vehicle 10 and away from the road surface.

Figure 3:
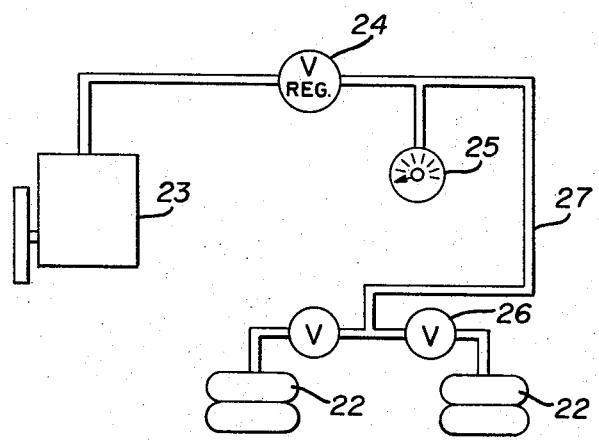
FIG. 3 is a symbolic diagram of an air inflation system for the air bags seen in FIGS. 1 and 2 of the drawings.

In FIG. 3 of the drawings, a symbolic diagram of means for inflating and deflating the air bags 22 may be seen and by referring thereto it will be observed that a compressor is indicated by the numeral 23, a regulator at 24, a gauge at 25 and control valves 26 are positioned in connecting piping 27.

It will thus be seen that when the vehicle is carrying a load the air bags 22 may be inflated as seen in FIG. 1 of the drawings and the auxiliary axle 16 with its wheels 17 used to help support the load and spread the same over a greater area of the roadway. At such time as a vehicle is empty the air bags 22 may be deflated and the springs 18 will lift the axle 16 with its wheel 17 away from the roadway. There are several advantages, both with respect to wear and tear on the auxiliary wheels 17 and tax wise in that the number of axles supporting a vehicle on a roadway determine the tax rate in many jurisdictions.

Those skilled in the art will observe that the pair of single leaf springs 18 act as trailing arms in that they hold the axle 16 and the wheels 17 in a desirable position beneath the vehicle 10 and at the same time permit it to move relative thereto. The fact that the forward ends of the single leaf springs 18 are attached to the U-bolt clamps 19 of the conventional vehicle spring suspensions supporting the principle axle 14 of the vehicle contributes to the efficiency of the invention herein disclosed in that the forward ends of the single leaf springs move relative to the vehicle depending upon the load on the vehicle and the condition of the conventional springs 13 as will be readily understood by those skilled in the art.

The vehicle suspension disclosed herein can be modified by substituting springs 18 having more than a single leaf is desired and arranged so that their tendency is to lift the auxiliary axle 16 and the wheels 17 thereon away from the roadway and toward the vehicle 10.

It will thus be seen that an improved and simplified vehicle suspension has been disclosed which enables an operator of a truck or a truck-trailer combination to lift an auxiliary axle from ground engagement when in the no-load condition and thereby cut down on wear on the wheel and axle assemblies which would otherwise take place as well as reducing the number of wheel and axle assemblies on the truck for tax purposes.

Although but one embodiment of the present invention has been illustrated and described it will be apparent to those skilled in the art that various changes and modifications may be made therein without departing from the spirit of the invention.

Having thus described my invention what I claim is:

1. A wheel suspension for a vehicle having a first wheel and axle assembly and first springs on said wheel and axle assembly arranged to pivotally engage said vehicle, said suspension including an auxiliary wheel and axle assembly, parallel elongated secondary springs having opposite end portions attached to said first wheel and axle assembly and to said auxiliary wheel and axle assembly, said parallel elongated secondary springs normally urging said auxiliary wheel and axle assembly toward said vehicle and air bags positioned between said auxiliary wheel and axle assembly and said vehicle acting when inflated to move said auxiliary wheel and axle assembly away from said vehicle and means for inflating and deflating said air bags.

2. The wheel suspension of claim 1 and wherein attachment means secures said first wheel and axle assembly to said first springs on said vehicle and one of the opposite end portions of said parallel elongated secondary springs are secured to said attachment means.

3. The wheel suspension of claim 2 and wherein said attachment means comprises U-bolt clamps and said parallel elongated secondary springs are positioned by said clamps between said first wheel and axle assembly and said first springs on said vehicle.

4. The vehicle suspension of claim 1 and wherein said parallel elongated secondary springs are single leaf springs of a U-shape in unloaded condition.

5. The vehicle suspension of claim 1 and wherein the parallel elongated secondary springs are positioned in trailing arm relation to said first wheel and axle assembly.

* * * * *